US005340080A

United States Patent [19]

Cleland

[11] Patent Number: 5,340,080

[45] Date of Patent: Aug. 23, 1994

[54] FLOW CONTROL DEVICE

[76] Inventor: Robert K. Cleland, 11051 Via El Mercado, Los Alamitos, Calif. 90720

[21] Appl. No.: 13,014

[22] Filed: Feb. 2, 1993

Related U.S. Application Data

[63] Continuation-in-part of Ser. No. 841,093, Feb. 25, 1992, Pat. No. 5,316,180.

[51] Int. Cl.[5] .................... G05D 7/01

[52] U.S. Cl. .................... 251/120; 138/45; 251/121

[58] Field of Search .................... 251/120, 121, 122; 138/45

[56] References Cited

U.S. PATENT DOCUMENTS

| | | | |
|---|---|---|---|
| 1,065,913 | 7/1913 | Bice | 251/121 X |
| 2,783,083 | 2/1957 | Canter | 251/120 X |
| 3,195,561 | 7/1965 | Sovitzky | 251/120 X |
| 3,797,524 | 3/1974 | Sanelli | 251/121 X |
| 4,248,270 | 2/1981 | Ostrowski | 251/120 |

*Primary Examiner*—Stephen M. Hepperle

[57] ABSTRACT

A flow control device including an elongate body with a central longitudinal flow passage with upstream and downstream ends; an elastic orifice plate with a central orifice extending transverse the flow passage; and, a diffuser part projecting into the flow passage downstream from the plate and upon which a jet of fluid issuing and flowing downstream from the orifice in the plate impinges and is diffused; the diffuser part is placed downstream from the plate a distance so that it serves to diffuse the jet of liquid before its movement downstream in the flow passage generates a minus downstream of the plate.

6 Claims, 1 Drawing Sheet

FLOW CONTROL DEVICE

This application is a continuation in part of my application for U.S. Letters Patent Ser. No. 841,093 for BEVERAGE DISPENSING MACHINE WITH PRESSURIZED WATER AND SYRUP SUPPLIES, filed Feb. 25, 1992 now U.S. Pat. No. 5,316,180.

BACKGROUND OF THE INVENTION

In the fluid handling art, it is common practice to conduct fluids through fluid passages, such as ducts, tubing and pipes, under variable and/or constant head pressures. The head pressures determine the rate and volume of flow of the liquids through the passages.

In many instances, the rate and volume of flow through and issuing from the passages must be very accurately controlled. In such situations, any variations of the head pressures alter the rate and volume of flow. To prevent variations in the rate and volume of flow of liquids through passages in response to variations of the head pressures thereon, the art provides various kinds and/or forms of flow metering devices that are most commonly in the nature of valves and orifice plates or fittings; most of which are well known to those skilled in the art.

Those flow control devices provided by the prior art that are accurate, tend to be quite complicated and costly to make and maintain. The simpler and less costly prior art flow control devices tend to be somewhat inaccurate, though considerably more practical to use and maintain and far less costly.

One of the more accurate and yet most practical forms of flow control devices provided by the prior art are elastic orifice plates with upstream and downstream surfaces and that are arranged to extend across their related flow passages. Those elastic orifice plates are formed so that fluid pressure at their upstream surfaces (independent of the pressure differentials thereacross) cause the plates to deform in a manner to constrict or reduce the effective cross-sectional area of the orifices therein. The extent to which the orifices are constricted is proportional to increases of pressure (upstream of the plates) that are above a neutral pressure at which the plates commence to function to meter the fluid flowing through them.

The effective range of pressure that the above-noted elastic orifice plates can effectively meter the fluids flowing through them is rather limited. Accordingly, various "sizes" of those devices are provided for handling different fluids at different pressures and in different volumes. Accordingly, when elastic orifice plates are used, one selects that available size of plate that most closely meets his requirements. Accordingly, in a great number of instances, a user of those plates cannot find a size of plate that exactly meets his needs and is left to adopt and use that available size of plate that most closely meets his needs. In doing so, he must often compromise that which he seeks to achieve.

Elastic orifice plates of the character referred to above are non-adjustable and, to the best of my knowledge and belief, the art has failed to provide any means which effectively enables adjustment of the flow rate of liquids through them.

OBJECTS AND FEATURES OF MY INVENTION

It is an object of my invention to provide an improved liquid flow metering device that is operable to adjust the flow rate of liquid through an elastic orifice plate that is included in and is a part of the device. Another object of my invention is to provide a device of the character referred to above that adjusts the flow rate through the orifice plate to a desired reduced flow rate and that further operates to materially reduce the extent of those variations in the flow rate of liquid through the plate caused by variations on the head pressure of the liquid when the plate is used separate from its device and as intended by its manufacturer.

It is an object of this invention to provide a liquid flow control device of the character referred to above which is such that the range of adjustment of the rate of flow through each standard size (different flow rate) of elastic orifice plate included in most commercially available lines of elastic orifice plates, extends to at least the rate of flow of the next smaller size plate; so that by using different standard sizes of plates in my device the rate of flow through it can be adjusted to any desired rate that is at and between the different standard rates of flow that are afforded by commercially available, elastic orifice plates.

It is an object and a feature of my invention to provide a flow metering device of the general character referred to above that includes a body with a flow passage having upstream and downstream ends to connect with upstream and downstream liquid conducting parts; an elastic orifice plate within the body to extend across the flow passage therein and having upstream and downstream surfaces and a central orifice concentric with the flow passage; and, a manually adjustable flow control valve with a valve part that extends into and is movable within the flow passage to vary the effective cross-section of the flow passage downstream of the orifice plate and that is in such close proximity to the downstream surface of the orifice plate to prevent a stream of liquid issuing from the orifice in the plate from flowing freely downstream through the flow passage in a manner to create a minus pressure in the flow passage downstream of the plate and about the orifice therein and that would otherwise tend to draw excess liquid through the plate and cause excessive downstream deflection and distortion of the plate to adversely affect its flow metering capacity.

The foregoing and other objects and features of my invention will be apparent and fully understood from the following detailed description of one typical preferred form and embodiment of my invention throughout which description reference is made to the accompanying drawings.

DETAILED DESCRIPTION OF THE INVENTION

Figure 1:
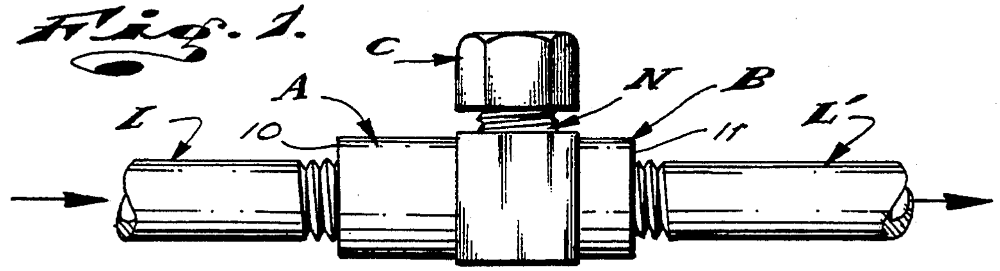
FIG. 1 is an elevational view of my new flow control device.
Figure 2:
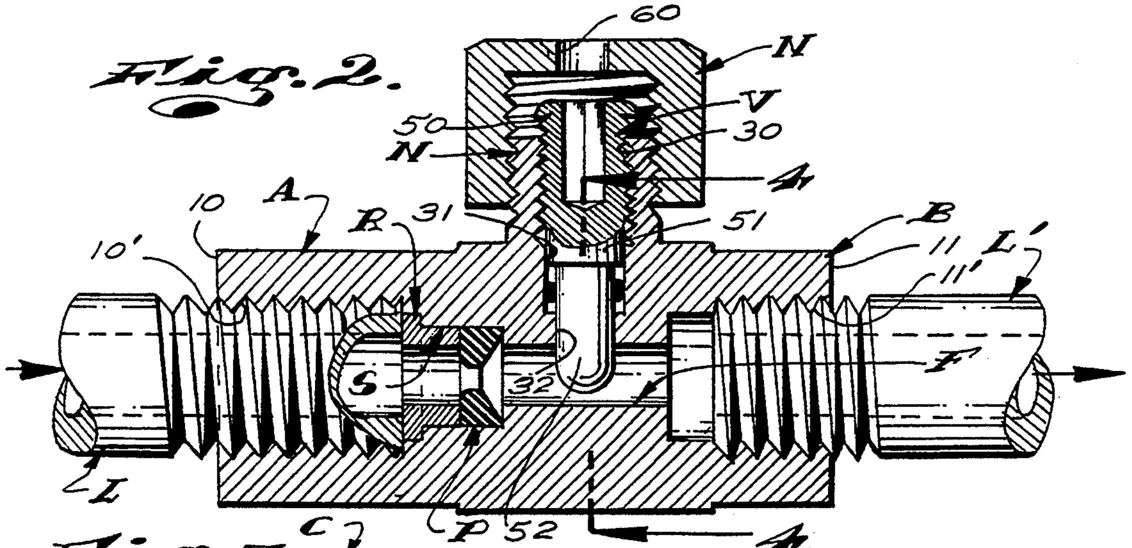
FIG. 2 is an enlarged detailed sectional view of the structure shown in FIG. 1.

In FIG. 1 of the drawings I have shown my new flow control device A engaged with and between upstream and downstream sections L and L′ of a high pressure fluid conducting pipeline or the like.

The device A includes an elongate body with upstream and downstream ends 10 and 11 formed with pipe coupling means 10′ and 11′ with which the pipe sections L and L′ are coupled. The means 10′ and 11′ can vary widely in form and, for the purpose of this disclosure, are simple internally threaded openings entering the ends 10 and 11 of the body.

The body B next includes a central longitudinally extending flow passage F that is smaller in diameter than and occurs between the threaded openings of the means 10′ and 11′.

The body B next includes an elastic orifice plate seat S that occurs at and between the inner or downstream end of the means 10′ and the upstream end of the flow passage F. The seat S has a circular, radially inwardly disposed side wall 20 concentric with the passage F and a flat radially extending support surface 21 that is disposed upstream in the body.

The body B next includes a radially outwardly projecting, elongate, valve neck N with a central longitudinally extending internally threaded bore 30 entering its outer end; an elongate cylindrical first counter bore 31 concentric with and extending radially inward from the inner end of the bore 30 and terminating to form an annular outwardly disposed seat; and, a second counter bore 32 concentric with the bores 30 and 31 and extending inwardly from the bore 31 to open at and communicate with the flow passage F. In my preferred embodiment of the invention, the second counter bore 32 is equal in diameter with the flow passage F.

In the form of the invention shown, the outer end portion of the neck N is externally threaded.

The device A next includes a standard elastic orifice plate P that is positioned in the seat S in the body. The plate P is a flat disk-shaped part made of a suitable synthetic rubber, such as Neoprene, or other suitable elastic material. The plate P has radially extending axially disposed upstream and downstream surfaces 40 and 41; a radially outwardly disposed annular exterior surface 42; and, an axially extending central flow port or aperture 43. The aperture 43 is smaller in diameter than the flow passage F.

The plate P is positioned in the seat S with its downstream surface 41 in opposing supported engagement on and with the support surface 21 of the seat S; with its side wall 42 in close sliding engagement with the side wall 20 of the seat and with the orifice 43 concentric with the flow passage F.

Figure 3:
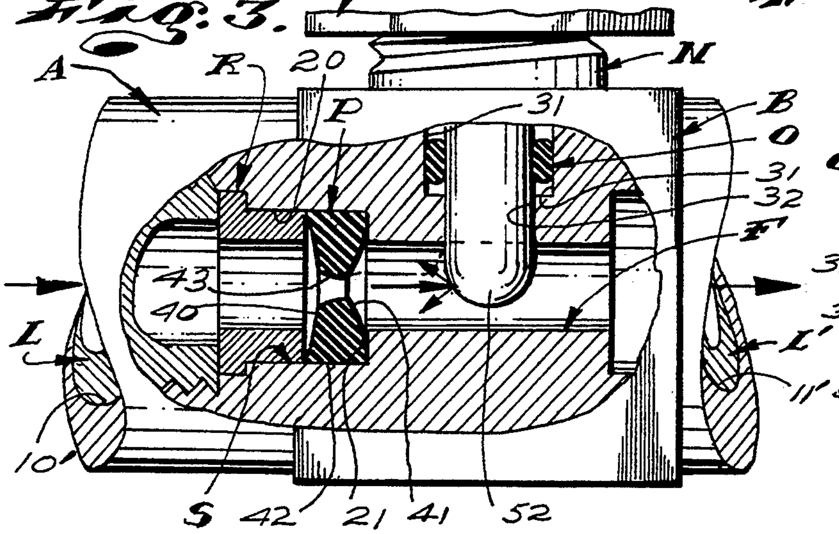
FIG. 3 is an enlarged view of a portion of the structure shown in FIG. 2 and showing the orifice plate in a deformed condition.
Figure 4:
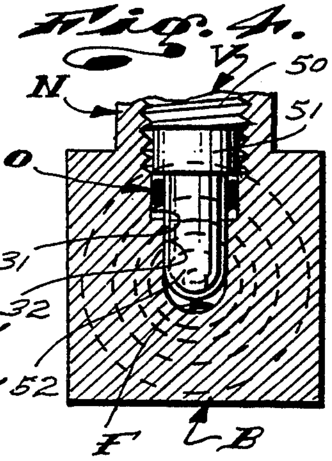
FIG. 4 is a sectional view taken substantially as indicated by Line 4—4 on FIG. 2; and, FIG. 5 is a sectional view of another embodiment of my invention.

The downstream surface 41 of the plate is shown as being tapered radially inwardly and in an upstream direction. The plate is of sufficient axial extent or thickness so that when the central portion thereof is displaced axially in a downward stream direction by liquid or fluid pressure acting upon its upstream surface, the elastic material that occurs about and defines the aperture is displaced radially inwardly to constrict or reduce the effective cross-sectional area of the aperture as clearly shown in FIG. 3 of the drawings. The plate is designed so that the extent to which the aperture is constricted is proportional to the extent to which the plate is deformed axially by fluid pressures and is such that potential increases in the flow rate of fluid through the plate, caused by increased pressures, are substantially countered or nullified by the reduced flow capacity of the constricted orifice. While the above-noted intended function of the plate is reasonably effective throughout a small range of changes of pressure, its effectiveness to maintaining a constant flow rate decreases at an exponential rate as pressures increase and its effectiveness to maintain a close to constant volumetric flow rate is soon lost.

An inherent and necessary function of the plate P is the generating of a pressure drop between its upstream and downstream sides. The plate P is designed to flex or work in response to the fluid pressures acting upon its upstream side alone and is not functionally dependent upon that primary pressure drop or differential in pressures that it generates between its upstream and downstream sides. Accordingly, while some consideration and allowance might be made to compensate for the pressure drop that occurs between the upstream and downstream sides of the plate, the plate is designed and operates on the theory that the inherent primary pressure drop that it generates between its upstream and downstream sides has no operative effect and that the theoretical pressure at the downstream surface or side of the plate is zero.

In practice, the flow rate and effective operating size of different makes, models and designs of elastic orifice plates is subject to such wide variation that to cite any one plate as an example for the purpose of this disclosure, would serve no useful purpose. It will suffice to note that the flow rate of any one make and size of orifice plate is different when it is subjected to different operating pressures. Accordingly, different sizes of plates are often used to establish and maintain one rate of flow, when different operating pressures are to be encountered. A hypothetical example of the foregoing would be; if a desired volumetric rate of flow under a mean operating pressure of 15 psi (plus or minus 2 psi) is maintained with one standard orifice plate having a 1/16″ orifice and the mean operating pressure is to be increased to 30 psi (plus or minus 3 psi) a standard plate with a 1/32″ orifice would have to be used to establish and maintain similar volumetric flow rate.

My new device A next includes an orifice plate retainer R in the form of an apertured disk that is press-fitted into the seat S upstream of the plate P. In the form of my invention illustrated, the retainer R is shown engaged by the inner end of the upstream pipe section L. The pipe section L serves to prevent displacement of the retainer R and plate P.

The device A next includes an elongate cylindrical valve part V. The part V is a unitary part with a cylindrical externally threaded outer portion 50 that is threadedly engaged in the bore 30; a cylindrical central portion that is freely entered into the first counter bore 31 and an elongate cylindrical inner valve part 52 of reduced diameter that extends to and is slidably engaged through the second counter bore 32 and that enters the flow passage F.

The part 52 and flow passage F are equal in diameter. The inner end of the valve part 52 is hemispherically formed and is such that when the part 52 is fully advanced into and across the passage F, it stops against and sealingly engages the surface of the passage F that opposes it.

The outer end of the portion 50 of the valve member V is formed with a tool engaging means M. The means M is shown as a polygonal Allen-head wrench socket entering the outer end of the member and that enables the member to be drivingly engaged by an Allen-head wrench or the like for the purpose of turning the member and advancing or retracting the valve part 53 into and out of engagement within the passage F.

The device A next includes an O-ring seal O engaged in an annular defined by the first counter bore 32 and a portion of the valve part 52 that extends freely into the counter bore 32; as clearly shown in the drawings.

Finally, the device A includes a keeper cap C threadedly engaged about and over the outer end of the valve neck N. The outer end of the cap C has a central wrench access opening 60 through which a wrench can be moved to engage the valve member V. The cap C serves to limit the extent to which the valve member V can be advanced outwardly from within the neck N and to thereby prevent displacement thereof. It can also serve as a lock nut to maintain the valve member V in set position.

In practice, the valve means of my device is, in effect, fully open and allows for the free flow of that metered volume of liquid that flows through the orifice plate when the valve part 52 is retracted from full engagement in and across the flow passage F a distance to establish a flow space or gap between the inner end of the valve part and the flow passage having an effective cross-sectional area that is only slightly greater than the maximum effective cross-sectional area of the orifice 43 in the plate P. When the valve part is so positioned, its inner end portion extends transverse and across the central axis of the passage F and of the orifice 43 in the plate P so that the high pressure, high velocity jet of liquid flowing downstream from the orifice impinges upon the valve part and is broken up and/or defused thereby. The valve part is positioned so that it diffuses the jet of liquid before it has moved downstream in and through the flow passage a sufficient distance to draw and maintain a secondary or added minus pressure in the passage, at the downstream surface of and acting on the plate P independent of the fluid pressure acting upon its upstream side.

If the valve means illustrated and described above is excluded or if it is operated to withdraw the valve part from engagement within the passage to an extent that the jet of liquid flowing downstream from the plate is not diffused by it, the jet will generate or draw a added or secondary minus pressure in the passage F at the downstream surface of the plate. The added or secondary minus pressure thus drawn is dependent upon the variable head pressure on the liquid and is subject to wide variations that cannot be satisfactorily compensated for. The variable secondary minus pressure that is drawn at the downstream surface of the plate supplements the variable positive head pressure acting upon the upstream surface of the plate. The combined variable positive and negative pressures acting upon the plate cause it to distort excessively in such an unpredictable manner that operation of my device is notably adversely affected.

In the course of developing my new device, I determined that the closer the valve part 52 is to the orifice plate P, the device becomes more effective and can be more easily adjusted to establish and maintain a desired flow rate through it. I determined that if the flow passage is ½" in diameter and the valve part is positioned as little as ½" downstream from the plate P, a sufficient minus pressure can be drawn by the jet so that the device does not work in a satisfactory manner. If the valve part is positioned more than 1" downstream from the plate, it has little or no appreciable affect on the operation of the plate. The above-noted effects brought about by the different placement of the valve means downstream from the plate P has led me to understand and believe that during operation of an elastic orifice plate without means downstream from it to diffuse the jet of liquid flowing from it, the jet of liquid establishes variable secondary minus pressures at the downstream side of the plate that work with the other variables that effect operation of the plate to materially adversely affect and limit the range of satisfactory operation of the plate.

In constructing my new device in the manner illustrated and described above, the distance of the valve part 52 downstream from the plate P can be easily made to be less than ½". In that embodiment of my device that I now produce and sell, the space between the downstream side of the orifice plate P and the valve part 52 is about ¼".

I have made and tested other embodiments of my invention wherein different kinds of valving means or structures, including needle valves and plug valves, were used. While those other embodiments of my device functioned as desired, their design was notably more complicated and the calculated cost to manufacture them was notably greater than a simple gate valve structure, such as is shown and described above.

In operation and use of my new device, the device can be provided with an orifice plate P that is of a size (rating) that will establish and maintain a desired predetermined volumetric flow rate of liquid at that predetermined operating head pressure that it is to be subjected to in that apparatus in which the device is to be used. When the device is engaged in the apparatus, the valve means thereof is partially opened and the liquid to be worked upon is caused to flow until the apparatus is fully charged with the liquid. Thereafter, with the operating head pressure maintained on the liquid, the valve means is operated to open or close until the desired flow rate, downstream of the device, is established.

In practice where the sizes of standard, available elastic orifice plates do not include a plate that is designed and constructed to establish the flow rate that is desired to be established and maintained, that available size of plate that is designed and constructed to maintain that rate of flow which is greater than and closest that rate of flow that is desired to be established is engaged in the device. When that device is engaged in its related apparatus, the apparatus is charged with liquid and the device is adjusted, by the valve means, to establish the desired rate of flow in the same manner as described above. Thus, my new device is effective to change or alter the operation of an elastic orifice plate to enable it to establish and maintain a flow rate that is different from that flow rate which it is designed to establish and maintain.

It is to be noted that when elastic orifice plates are used alone to establish and maintain a desired flow rate, should that flow rate change (for any reason), there is no way in which the desired flow rate can be re-established, except by replacing the orifice plate with a new or next size of orifice plate that will maintain desired flow. With my new device, the foregoing limitation in the use of elastic aperture plates is eliminated since (with few exceptions) the device can adjust the flow rate through any standard size of plate so that any desired rate of flow through it, from its design flow rate down to the design flow rate of the next smaller size of standard plate, can be attained by operation of the valve means.

While my preferred form and embodiment of the invention illustrated and described above includes the noted valve means that not only diffuses the jet of liquid issuing from the orifice plate but is also operable to selectively alter the operation of that plate to establish different rates of flow through it; its function to diffuse the jet of liquid and eliminate the establishment of a secondary minus pressure at the downstream side of the plate greatly enhances the accuracy and the effective operating range of the plate, whether or not the valve means might be utilized to adjust the fluid metering function of the plate. In some instances, the only use to which the valve means of my device is put is to diffuse the jet of liquid issuing from the elastic orifice plate before it adversely affects the functions of the plate.

Figure 5:
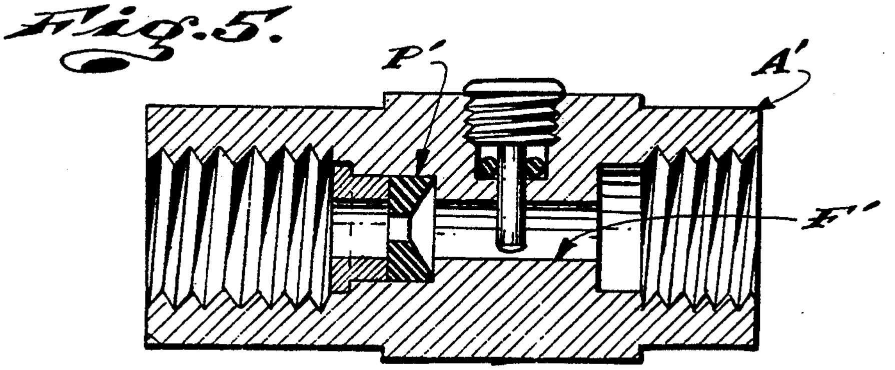

In accordance with the above, in FIG. 5 of the drawings, I have illustrated another embodiment of my device A′ wherein the valve means of the first embodiment of my invention is replaced by an elongate diffuser part 52′ suitably carried by the body B′ to enter and project radially inward into the flow passage F′ to intersect and diffuse a jet of liquid issuing from the orifice plate P′; in the same manner that the valve part 52 in my first embodiment of the invention functions to diffuse the jet of liquid.

Having illustrated and described only typical preferred forms and embodiments of my invention, I do not wish to be limited to the specific details herein set forth but wish to reserve to myself any modifications and/or variations that may appear to those skilled in the art and which fall within the scope of the following claims.

Having described my invention, I claim:

1. A flow metering device including an elongate body with upstream and downstream ends, a central longitudinally extending flow passage, coupling means at the upstream and downstream ends of the body to couple the body with upstream and downstream liquid conducting parts in communication with the flow passage, an annular plate seat in the passage; a disk-shaped elastic orifice plate with radially extending upstream and downstream surfaces and a central orifice engaged in the seat and extending radially across the passage to meter the flow of liquid from the passage upstream of the plate into the passage downstream of the plate and through which a pressure drop occurs that creates a primary minus pressure at the downstream surface of the plate with respect to the fluid pressure at the upstream surface of the plate; and, a diffusion part supported by the body and extending radially into and intersecting the central axis of the passage, the diffuser part is positioned in that proximity to the downstream surface of the plate where it is impinged upon by and diffuses a jet of liquid issuing from the orifice in the plate and prevents the jet from generating a secondary minus pressure that adversely increases the minus pressure acting upon the downstream surface of the plate; the body has an elongate radially outwardly opening bore on an axis that intersects the central axis of the body, the diffusion part has an outer portion threadedly engaged in the bore and an inner portion projecting into the passage.

2. The flow metering device set forth in claim 1 wherein the inner portion is movable transversely of the passage to selectively meter the flow of liquid moving in the passage from the upstream to the downstream side thereof.

3. The flow metering device set forth in claim 1 wherein a first counter bore extends inward from the bore and a second counter bore extending axially inward from the first counter bore, the diffusion part has an outer portion threadedly engaged in the bore, a central portion rotatably and axially shiftably engaged in the first counter bore and an inner portion rotatably and axially shiftably engaged through the second counter bore and projecting into the flow passage and intersecting the central longitudinal axis thereof.

4. The flow metering device set forth in claim 1 wherein a first counter bore extends inward from the bore and a second counter bore extending axially inward from the first counter bore, the diffusion part has an outer portion threadedly engaged in the bore, a central portion rotatably and axially shiftably engaged in the first counter bore and an inner valve portion rotatably and axially shiftably engaged through the second counter bore and projecting into the flow passage and intersecting the central longitudinal axis thereof, an annular sealing ring is positioned in the first counter bore and seals between the first counter bore and a portion of the inner valve portion of the diffuser part therein.

5. The flow metering device set forth in claim 1 wherein a first counter bore extends inward from the bore and a second counter bore extending axially inward from the first counter bore, the diffusion part has an outer portion threadedly engaged in the bore, a central portion rotatably and axially shiftably engaged in the first counter bore and an inner valve portion rotatably and axially shiftably engaged through the second counter bore and projecting into the flow passage and intersecting the central longitudinal axis thereof, the flow passage has a radially inwardly disposed cylindrical surface, the inner valve portion of the diffusion part is equal in radial extent with the passage and has a hemispherically formed end that opposes and is shiftable into and out of sealing engagement with an opposing portion of the surface of the passage.

6. The flow metering device set forth in claim 1 wherein a first counter bore extends inward from the bore and a second counter bore extending axially inward from the first counter bore, the diffusion part has an outer portion threadedly engaged in the bore, a central portion rotatably and axially shiftably engaged in the first counter bore and an inner valve portion rotatably and axially shiftably engaged through the second counter bore and projecting into the flow passage and intersecting the central longitudinal axis thereof, the body has a radially outwardly projecting externally threaded neck through which the bore extends, a retainer cap is threadedly engaged about the neck and overlies the outer ends of the bore and the diffuser part, the outer end of the outer portion of the diffuser part is formed with rotary tool engaging means, the cap is formed with a rotary tool access opening concentric with the diffuser part to accommodate a rotary tool part that is selectively engageable through the access opening and into rotary driving engagement with the tool engaging means.

* * * * *